United States Patent [19]

Maul et al.

[11] 4,098,761

[45] Jul. 4, 1978

[54] HALOGEN CONTAINING FIRE RETARDANT ADDITIVE WITH IMPROVED HEAT STABILITY

[75] Inventors: James J. Maul; Richard D. Carlson, both of Grand Island, N.Y.

[73] Assignee: Hooker Chemicals & Plastics Corp., Niagara Falls, N.Y.

[21] Appl. No.: 654,244

[22] Filed: Feb. 2, 1976

Related U.S. Application Data

[63] Continuation-in-part of Ser. No. 447,807, Mar. 4, 1974, Pat. No. 3,941,758.

[51] Int. Cl.$^2$ .................. C08K 3/22; C08K 5/02
[52] U.S. Cl. .......... 260/45.75 B; 260/45.7 R; 260/45.75 P; 260/45.75 W; 260/648 C; 260/892
[58] Field of Search ........... 260/45.7 R, 45.75 W, 260/45.7 RL

[56] References Cited

U.S. PATENT DOCUMENTS

| | | | |
|---|---|---|---|
| 2,519,190 | 8/1950 | Hyman | 424/352 |
| 2,676,131 | 4/1954 | Soloway | 424/275 |
| 2,717,851 | 9/1955 | Lidov | 424/352 |
| 3,347,822 | 10/1967 | Jenkner | 260/45.75 B |
| 3,403,036 | 9/1968 | Hindersinn et al. | 260/45.75 B |
| 3,419,518 | 12/1968 | Mahling et al. | 260/45.75 B |
| 3,658,634 | 4/1972 | Yanagi et al. | 106/15 FP |
| 3,730,929 | 5/1973 | Breza | 260/23 H |
| 3,787,356 | 1/1974 | Gourse | 260/45.75 B |
| 3,794,614 | 2/1974 | Versnel | 260/45.75 B |
| 3,828,003 | 8/1974 | Yamazaki et al. | 260/45.75 B |
| 3,888,820 | 6/1975 | Touval | 260/45.75 B |
| 3,899,463 | 8/1975 | Newcombe | 260/45.75 B |
| 3,940,355 | 2/1976 | Engelbrecht et al. | 260/28.5 AV |
| 3,950,456 | 4/1976 | Newcombe | 260/880 R |

FOREIGN PATENT DOCUMENTS 2,206,020   2/1972   Fed. Rep. of Germany.

OTHER PUBLICATIONS

Ungnade et al., *Chemical Reviews*, vol. 58, 1958, pp. 249–254 and 257–260.
Fray, Chem. Abs. vol. 59, 1963, 8614g.

*Primary Examiner*—Donald E. Czaja
*Assistant Examiner*—R. A. White
*Attorney, Agent, or Firm*—Peter F. Casella; William J. Crossetta, Jr.; Arthur S. Cookfair

[57] ABSTRACT

Halogenated derivatives of the Diels-Alder adducts of norbornenes and halocyclopentadienes are excellent fire retardant additives for polymers free of nitrogen in the monomeric units of the polymer chain, the additive-containing polymers being characterized by exceptional heat stability; excellent mechanical properties and improved molding characteristics.

21 Claims, No Drawings

HALOGEN CONTAINING FIRE RETARDANT ADDITIVE WITH IMPROVED HEAT STABILITY

CROSS-REFERENCE TO RELATED APPLICATION

This application is a continuation-in-part of U.S. application Ser. No. 447,807 filed Mar. 4, 1974, now U.S. Pat. No. 3,941,758, issued Mar. 2, 1976.

BACKGROUND OF THE INVENTION

This invention relates to new compositions of matter possessing unexpectedly good heat stability. More particularly, it relates to polyhalogenated norbornene or norbornadiene-halocyclopentadiene adducts, and mixtures thereof which are not only more efficient fire retardant additives for polymers but also unexpectedly resistant to decomposition at polymer molding temperatures.

DESCRIPTION OF THE PRIOR ART

It is known to prepare the monoadduct of norbornadiene and hexachlorocyclopentadiene. The resulting adduct and its use as an insecticide is disclosed in U.S. Pat. No. 2,635,977. The bromination of the monoadduct at 0° Celsius with elemental bromine is disclosed in J. Chem. Soc. 3669 (1960). Bromination at 65° Celsius in the presence of ultraviolet light is disclosed in British Pat. No. 692,546 and in U.S. Pat. No. 2,676,131. British Pat. No. 692,546 also discloses the chlorination of the monoadduct. Various other routes to the preparation of dichloro derivatives of the monoadduct of norbornadiene and hexachlorocyclopentadiene are disclosed in the art, see, e.g., U.S. Pat. No. 2,911,411, U.S. Pat. No. 2,804,420 and British Pat. No. 714,688.

It is known also to prepare the monoadduct of norbornene and hexachlorocyclopentadiene and to monohalogenate the adduct in the presence of light. See Cristol, et al, J. Org. Chem., 29, 1279 (1964). Various other syntheses of the monochloro derivative and its use as an insecticide are disclosed in U.S. Pat. No. 2,635,979 and Gazz. Chem. Ital., 85, 1118 (1955).

Although the prior art discloses the preparation of the mono- and di- halogen derivatives of the monoadducts of hexahalogenated cyclopentadiene and norbornene or norbornadiene and their use as insecticides, the prior art does not disclose various other polyhalogenated derivatives, nor the use of any of these compounds as fire retardant additives to normally flammable polymers. Further the prior art does not disclose the chlorobromo derivatives of the monoadducts of norbornenes (and norbornadienes) and halogenated cyclopentadienes.

FIELD OF THE INVENTION

It is known to prepare molded articles from polymerized monomers which are free of nitrogenous substituents by heating the polymers to temperatures of about 400° Fahrenheit under pressure in molding presses or to prepare extruded articles by forcing the heated polymer under pressure through an appropriate extrusion die. It is known further to impart varying degrees of fire retardance to the extruded or molded articles by incorporating in the extrudable or moldable mass various organic and inorganic substances. Many organic additives suggested for this purpose contain labile halogen, which under the molding conditions, tend to decompose causing discoloration and other physical degradation. For example, chlorinated paraffins, such as "chlorowaxes" are relatively effective as fire retardant additives and, being relatively inexpensive, are widely used. However, such substances decompose under some molding temperatures resulting in discoloration of the molded articles and hence their use in many molding applications is limited.

It is an object of the present invention to provide new polymeric compositions having improved fire resistance and improved heat stability.

Another object is to provide new heat stable fire retardant polymer compositions which do not discolor under molding conditions.

It is a further object of this invention to provide a novel fire retardant polymer compositions which do not decompose at polymer molding temperatures, i.e., at about 400° to 600° Fahrenheit.

Other objects of this invention will be obvious from the following description.

SUMMARY OF THE INVENTION

The compositions of this invention comprise a normally flammable nitrogen-free polymer and an effective fire retardant amount of a compound of the formula

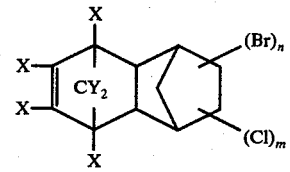

wherein X is a halogen selected from the group consisting of fluorine, bromine, and chlorine, Y is independently selected from the group consisting of fluorine, chlorine, bromine, alkyl of 1 to 10 carbon atoms, alkyloxy wherein the alkyl group contains from 1 to 10 carbon atoms, haloalkyl and haloalkyloxy wherein the said alkyl groups contain from 1 to 10 carbons and said halo- is fluoro, chloro or bromo, $n$ has an average value from 0 to 6, preferably 0 to 2, and $m$ has an average value from 0 to 6, preferably 0 to 4, and the total of $n$ plus $m$ is from 1 to 6, preferably 1 to 4.

All of these compounds may be prepared by reacting a norbornene or norbornadiene with a halocyclopentadiene of the structure

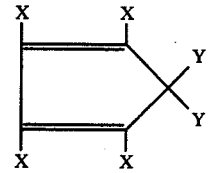

wherein X and Y are as defined above, thereafter reacting the resulting adduct with a halogenating agent such as sulfuryl chloride, sulfuryl bromide, chlorine, bromine, mixture thereof and the like. As disclosed hereinafter, it is sometimes advantageous to run these halogenations in the presence of a light or a free radical generating halogenation catalyst and recovering a halogenated norbornene halocyclopentadiene adduct of the above formula.

In accordance with this invention, it has been found that such products are effective fire retardant additives which, when added to normally flammable nitrogen-free polymers, which polymers are normally devoid of nitrogen in the monomeric units of the polymer chain, result in fire retardant polymeric compositions which are characterized by excellent stability at the temperatures of the usual polymer molding processes.

The polymer compositions containing the present additives are also characterized by excellent mechanical properties such as enhanced impact strength, ductility, flexural strength, tensile strength at break and/or percent elongation at break. The polymer compositions of the invention also possess improved molding characteristics such as the ability to be molded at elevated temperatures without formation of voids in the interior of the molded polymer.

The use of the present additives as fire retardants in nitrogenous polymers, i.e. polymers which contain nitrogen in the monomeric units of the polymer chain and which are prepared from nitrogen-substituted monomers, is disclosed in copending U.S. application Ser. No. 447,807 of which the present application is a continuation-in-part.

DESCRIPTION OF THE PREFERRED EMBODIMENTS

A preferred additive of this invention is the dibrominated derivative of the norbornene-hexachlorocyclopentadiene adduct, having the structure

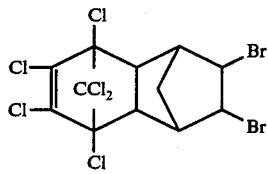

This compound, 6,7-dibromo-1,2,3,4,10,10-hexachloro-1,4,4a,5,6,7,8,8a-octahydro-1,4:5,8-dimethanonaphthalene which is obtainable by brominating the mono adduct of norbornadiene and hexachlorocyclopentadiene at about 0° Celsius with elemental bromine. Following isolation of the crude dibrominated derivative, it may be further purified by recrystallization from a suitable solvent, such as chloroform. The purified additive melts at about 173°–176° Celsius. By the addition of an effective amount of the product of this reaction in a normally flammable polymer, there is obtained a polymer composition which is not only fire retardant, but also surprisingly stable to heat at normal molding temperatures such as about 400° to 600° Fahrenheit.

This invention also includes the use of the hitherto unknown halogen derivatives having the formula

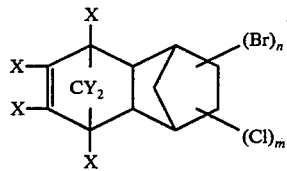

wherein X and Y are as defined above, $n$ has an average value from 0 to 6, $m$ has an average value from 0 to 6, the total of $n$ plus $m$ is 2 to 6, with the proviso that when the total of $n$ plus $m$ is about 2, $m$ is about 1, and $n$ is about 1.

Such novel compounds are obtainable by, for example, forming the adduct of a norbornene or norbornadiene and a halogenated cyclopentadiene and thereafter dissolving the said adduct in a suitable solvent, e.g., carbon tetrachloride. Chlorine, bromine or mixtures thereof (which may be dissolved in a suitable solvent, such as carbon tetrachloride) is added to the resulting solution of the adduct. The reaction solution may be irradiated with a suitable source of wave energy, such as sunlight, ultraviolet light, or incandescent light to faciliate the reaction. Other chemical free radical initiators, as hereinafter disclosed, may also be useful to promote reaction. The solvent is stripped from the mass leaving as a residue, an oily product which is identified as chloro-brominated norbornene-halogenated cyclopentadiene adduct.

The invention also includes the use of the hitherto unknown tetrachlorinated derivative of the formula

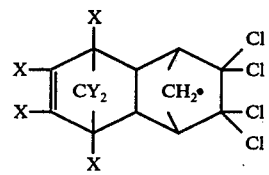

wherein X and Y are as defined above.

The new compound is obtained by dissolving the norbornene-halogenated cyclopentadiene adduct in a suitable solvent, e.g., carbon tetrachloride and bubbling chlorine gas into the solution which is illuminated by a suitable source of wave energy, e.g., ultraviolet light. The addition of chlorine is continued until the effluent gas is practically free from hydrogen chloride, generally from about 4 to about 24 hours. After flushing the reaction mass with an inert gas, e.g., nitrogen, the solvent is stripped from the mass leaving a residue containing the new compound 6,6,7,7-tetrachloro derivative of the norbornene-halogenated cyclopentadiene adduct of the above formula. This reaction product may be used directly or after purification by conventional means, e.g., by recrystallization, as a fire retardant additive to normally flammable polymers.

Halogenated cyclopentadienes suitable for use in the preparation of the adducts described above include hexahalocyclopentadienes, such as hexachlorocyclopentadiene, hexafluorocyclopentadiene and hexabromocyclopentadiene, monoalkyl-pentahalocyclopentadienes, such as 1-methyl-pentachlorocyclopentadiene, 1-ethyl pentabromocyclopentadiene, 1-hexyl pentafluorocyclopentadiene, 1-decyl pentachlorocyclopentadiene; dialkyltetrahalocyclopentadienes such as 1,1-dimethyl tetrachlorocyclclopentadiene, 1,1-dibutyl-tetrachlorocyclopentadiene, 1-methyl, 1-hexyltetrabromocyclopentadiene, 1,1-dinonyl-tetrafluorocyclopentadiene, 1,1-didecyl tetrachlorocyclopentadiene; alkoxy halocyclopentadienes such as 1-methoxy-pentachloro-and 1,1-dimethoxy tetrachlorocyclopentadiene, 1-hexoxy pentabromo-, and 1-hexoxy, 1-octoxy tetrabromocyclopentadiene, 1-decoxy-pentachloro- and 1,1-didecoxy-tetrachlorocyclopentadiene, 1-ethoxy-pentafluoro- and 1-ethoxy, 1-butoxy-tetrafluorocyclopentadiene; monohaloalkyl halocyclopentadienes such as 1-chloromethylpentachlorocyclopentadiene, 1,1-bis(-chloro-methyl) tetrachlorocyclopentadiene, 1-bromoethylpentabromocyclopentadiene, 1,1-bis-(bromohexyl) tetrachlorocyclopentadiene, 1-fluorodecyl pentafluorocyclopentadiene, 1,1-bis-(fluorodecyl) tetrafluorocyclopentadiene, 1-chloromethyl, 1-bromopropyl tetrabromocyclopentadiene. The preferred halocyclopentadiene is hexachlorocyclopentadiene.

The adduction step is preferably in liquid phase reaction. Although the reactants may be combined directly, the reaction is preferably carried out in the presence of a solvent.

The solvent may be an excess amount, over the stoichiometrical proportion, of either of the reactants or a solvent which is inert to the reactants and the reaction product may be used. Preferably, the solvent should boil above about 90° Celsius. Suitable non-reactive solvents include toluene, xylene, nitrobenzene, methylcyclohexane, perchloroethylene, acetylene tetrachloride and the like.

The reactants may be employed in various proportions. When the reactants are a halocyclopentadiene and a norbornene, a molar ratio of one to one is preferred, but an excess, for example, 20 percent, of either reactant can be employed. However, when the reactants are a halocyclopentadiene and a norbornadiene, it is preferred to employ at least about 100 percent excess of the norbornadiene to obtain maximum yields.

The temperature employed in the adduction step may range from about 75° Celsius to about 200° Celsius, although temperatures outside this range can be used. Preferably, the adduction reaction is effected at about 85° to about 170° Celsius. The time required for the adduction to go essentially to completion may vary according to the reactivity of the halocyclopentadiene, the presence or absence of solvent, the temperature of the reaction, etc. Generally, a reaction period between about 5 and 100 hours will suffice, but preferably from about 10 to 48 hours.

The reaction is preferably and conveniently carried out under atmospheric pressure conditions although superatmospheric pressures may be used, and on occasion may be preferred, especially when one of the reactants is of low reactivity and/or high volatility. Generally, when superatmospheric pressure is used, autogeneous pressure will suffice although pressures of from 1.1 atmospheres to 100 atmospheres or more can be used.

Following completion of the adduction step, the solvent, if present, may be removed, e.g., by distillation and the adduct product purified, e.g., by distillation, recrystallization or both. Alternatively, the crude adduct can be halogenated directly, before or after removal of the solvent, if present. However, if the solvent (for example, toluene) used in the adduction step is reactive to halogen, it should be removed prior to halogenation of the adduct. In particular, if the solvent for the adduction of hexachlorocyclopentadiene is in excess of norbornadiene, it should be removed prior to bromination since it has been reported that upon reaction with bromine, it produces toxic materials. (J.A.C.S. 83, 1516 (1961)).

The second, or halogenation step of the process is preferably a liquid phase reaction, also. The temperature employed ranges from about −20° to about 150° Celsius. Preferably, the reaction temperature is within the range of about −10° to about 100° Celsius. The time required may vary considerably and according to the degree of halogenation desired. Generally, from a few minutes to about twenty-four hours will be required although this period may vary, according to the temperature of the reaction, the rate at which the halogenating agent is fed into the reaction solution, the quantity of reactants, the presence, type and quantity of catalyst, reactivity of the substrate and the like variables.

The solvent used in this step should be one that is inert to the reactants and the reaction product. Typical of the solvents which may be used include chlorinated aliphatics of from 1 to 6 carbon atoms, such as carbon tetrachloride, chloroform, and the like.

When the adduction reactants are a halocyclopentadiene and norbornadiene the resultant adduct is halogenated by an addition reaction employing halogenation reagents such as chlorine, bromine or mixtures thereof such as bromine chloride. This may occur via an ionic or free radical mechanism. Subsequent to the halogen addition to the adduct of a halocyclopentadiene and norbornadiene, further halogenation may be accomplished via a free radical substitution pathway discussed in the following paragraph, which relates to free radical halogen substitution of the adduct of norbornene and a halocyclopentadiene.

When the adduction reactants are a halocyclopentadiene and norbornene, the resultant adduct is halogenated by a substitution reaction employing a free radical halogen substituting agent. Free radical halogenating agents which can be used in this process are known. Among the free radical chlorinating agents which can be used, the following are typical examples: chlorine; t-butyl hypochlorite; sulfuryl chloride; chlorine monoxide; trichloromethanesulfonyl chloride; trichloromethanesulfenyl chloride; N-chlorosuccinimide; phosphorus pentachloride; iodobenzene dichloride; cupric chloride; N-chlorosulfonamide; N-chloro-dimethylaminesulfuric acid-acetic acid-ferrous sulfate.

As examplary of the free radical bromination agents which are useful in this process the following are mentioned: bromine; N-bromosuccinimide; sulfuryl bromide; bromotrichloromethane; t-butyl-hypobromite; trichloromethanesulfonylbromide; bromine-chlorine mixtures.

By the term "free radical halogen substituting agent" is meant any halogenating agent capable of effecting halogen substitution under free radical conditions. A discussion of this type of halogenation reaction is contained in "Free Radical Chemistry" E. S. Hyser, editor, published by Marcel Dekker, New York, 1969, particularly, for chlorination, see Vol. I, Chapter 3, by M. L. Poutsma, and, for bromination, see Vol. II, Chapter 2, by W. A. Thaler.

The preferred free radical halogen substituting agents are chlorine, bromine, sulfuryl chloride, sulfuryl bromide and mixtures thereof, because of their general effectiveness, availability and relative low cost.

In the case of substitution reactions, mixtures of bromine and chlorine can be used to brominate organic compounds to conserve the amount of the relatively expensive bromine. Halogenated products produced using mixtures of bromine and chlorine, while essentially brominated derivatives invariably also contain some proportions of the mixed halogenated derivatives, that is, the products contain bromine and chlorine substituents.

The amount of halogenation agent employed is dependent on the amount of halogen desired in the final compound. In general, a molar ratio of from about 1 to about 15 moles of halogenation agent per mole of adduct is satisfactory.

The reaction product of the halogenation step may be a mixture of halogenated compounds having an average of between about 2 and 6 halogen atoms on the norbornene moiety of the adduct. Such a mixed reaction product may be separated from the solvent, for example, by a simple distillation of the solvent. The resultant mixture of halogenated adduct, having an average halogen content in accordance with the above formulae, may be employed directly as a fire retardant without further purification. Alternatively, the mixture may be separated into its component compounds by known separation methods such as vacuum distillation, fractional crystallization and the like, and the separated compounds having between about 2 and 6 halogen atoms on the norbornene moiety may be used as fire retardant additives.

In either the substitution or addition type reaction, the halogenation step can be effected in the presence of a catalytic proportion of a halogenation catalyst. Typical of the catalysts suitable for use in this step include sunlight; incandescent light; ultraviolet light; organic peroxides which decompose to free radicals under reaction conditions, such as benzoyl peroxides, lauryl peroxide, 2-ethylhexyl peroxydicarbonate, methyl ethyl ketone peroxide; azo compounds, such as azo bis isobutyronitrile, 2,2' azo bis (2,4-dimethyl valero) nitrile. Preferably, a source of wave energy, e.g., sunlight, incandescent or ultraviolet light, is used to catalyze the halogenation of the adduct.

The halogenated norbornene-polyhalocyclopentadiene adducts disclosed above are useful as fire retardant additives for normally flammable copolymers derived from monomers devoid of nitrogen substituents for example, thermoplastics, such as polyethylene, polypropylene, polystyrene, high impact polystyrene (a graft blend of polystyrene and polybutadiene interpolymer), polyesters, and polyacrylates, thermosets such as phenolics, epoxies, unsaturated polyesters, and the like; elastomers or rubbers such as styrenebutadiene rubbers (SBR) and the like. These compounds can also be used to impart fire resistant properties to other high molecular weight polymers, copolymers and resins derived from monomers free of nitrogen including, for example, those disclosed in U.S. Pat. No. 3,403,036, the disclosure of which is incorporated herein by reference.

The fire retardant additive compounds are desirably incorporated in the normally flammable polymeric materials in an effective fire retardant amount. Generally, the compounds in the amount of from about 2 to about 50 percent by weight of the polymeric composition and desirably from about 5 to about 40 percent by weight, preferably, from about 10 to about 35 percent by weight of the polymeric compositions are mixed into said composition. Improved fire retardance and other desirable characteristics can be provided by incorporating other adjuvants such as metallic compounds such as antimony, tin, zinc, iron, bismuth and arsenic compounds, e.g., antimony oxide, zinc oxide, iron oxide, and arsenic sulfide, generally in the amount of about 1 to about 30 percent by weight and preferably from about 2 to 25 percent by weight of said polymeric composition. The preferred metallic compounds are zinc oxide, iron oxide, and antimony oxide.

Other adjuvants such as plasticizers, mold release agents, lubricants, fillers, dyestuffs and pigments, may be included also.

The components comprising the compositions of this invention can be mixed by any of several well known methods. The additives can be introduced into the polymer or its precurser(s) while the latter is dissolved in a suitable solvent. This procedure is especially suitable when it is desired to incorporate the additives during the polymer manufacturing process. When the polymer is subsequently recovered from the solvent, the additives are intimately mixed with the polymer. The additives may be mixed with the polymer in the finely divided state and the mixture dry blended so that an intimate mixture is obtained on molding, milling, or extrusion. Alternatively, the additives may be mixed with the polymer in the molten state at temperatures which can range from the melting point to just below the decomposition temperature of the polymeric composition.

The following examples will illustrate the invention, but such examples are not intended to limit the scope of the invention. In the examples as well as in the above specification and claims appended hereto, parts and percentages are by weight and temperatures are given in degrees Celsius, unless otherwise specified. The properties of the polymer compositions were tested in accordance with the standard American Society for Testing Materials (ASTM), test procedure ASTM D 635-72.

In some of the examples a modified ASTM D 635-72 test was employed in that a cylindrical specimen about 150 mm long × 8 mm in diameter was substituted for the usual 127 mm length × 12.7 mm width bar, or in that the number of samples tested was fewer than the minimum number of samples prescribed by the ASTM.

The properties of the molded polymer compositions were also tested for Oxygen Index by the test procedure ASTM D 2863-70, and/or by Underwriters Laboratory Test Method 94.

EXAMPLE IA

Preparation of the Mono-Adduct of Norbornadiene and Hexachlorocyclopentadiene

A solution of 273 parts of hexachlorocyclopentadiene and 92.2 parts of norbornadiene was added slowly, over a period of one hour to 276.4 parts of norbornadiene under reflux conditions in an atmosphere of nitrogen. The mixture was held at refluxing temperature (87° to 107°) under an atmosphere of nitrogen for 97.5 hours. The excess of norbornadiene was removed by distillation at atmospheric pressure. The remaining product was twice distilled to yield 285.3 parts of the mono-adduct. Further purification was effected by recrystallization from ethanol and discolorization with carbon. The purified product, 1,2,3,4,10,10-hexachloro-1,4,4a,5,8,8a-hexahydro-1,4:5,8 dimethanonaphthalene melted at 105° to 107°.

EXAMPLE IB

Bromination of the Adduct

A portion, 490.5 parts, of the adduct prepared in Part A, above, was dissolved in 1024 parts of carbon tetrachloride. To the cooled solution there was added, over a 20-minute period, a solution of 217.2 parts of bromine in 352 parts of carbon tetrachloride. During the addition, the reaction temperature was moderated at 0° to 2°. The reaction mixture was then permitted to stand for about 16 hours without further temperature control. The precipitated white solid was filtered off and washed with 100 parts of carbon tetrachloride to yield 580.7 parts of solid which was purified by recrystallization from chloroform, including a treatment with decolorizing carbon. The product thus obtained was 6,7-dibromo-1,2,3,4,10,10-hexachloro-1,4,4a,5,6,7,8,8a- octahydro-1,4,5,8-dimethanonaphthalene which melted at 173° to 176°.

EXAMPLE IIA

Preparation of the Mono-Adduct of Norbornene and Hexachlorocyclopentadiene

A mixture of 312 parts of norbornene and 885.6 parts of hexachlorocyclopentadiene was heated under a reflux condenser. The mixture was heated from 124° to 150° during a 90-minute period and maintained at about 150° for about 18 hours thereafter. The mass was permitted to cool to ambient temperature. The resulting crude adduct was purified by distillation in vacuum. There was thus obtained 1041.7 parts of 1,2,3,4,10,10-hexachloro-1,4,4a,5,6,7,8,8a-octahydro-1,4:5,8-dimethanonaphthalene, boiling at 139° to 141° at 0.2 mm of mercury. The distillate solidifed upon cooling.

EXAMPLE IIB

Bromination of the Mono-Adduct of Part A with Bromine Chloride

A solution of 179 parts of bromine and 78 parts of chlorine in about 288 parts of carbon tetrachloride was added dropwise to a solution of 309 parts of the adduct prepared in Part A above dissolved in about 1072 parts of carbon tetrachloride while the solution was irradiated with a 200 watt incandescent lamp. The mixture was agitated and irradiated for about 1.5 hours following addition of the halogenating agent and then partially stripped of solvent to remove excess halogenating agent. The reaction mass was dissolved in fresh carbon tetrachloride and washed with 5% aqueous sodium bicarbonate and then with water. The light yellow solution was dried over anhydrous magnesium sulfate and then treated with decolorizing carbon. The colorless solution was then concentrated to a partially crystalline oil. This product (437 parts) was determined by elemental analysis to be a mixture of brominated derivatives of norbornene-hexachlorocyclopentadiene adduct having an average formula $C_{12}H_8Br_{1.5}Cl_6$.

EXAMPLE III

Preparation of 1,2,3,4,6,6,7,7,10,10-Decachloro-1,4,4a,5,6,7,8,8a-Octahydro-1,4:5,8-Dimethanonaphthalene An adduct of norbornene and hexachlorocyclopentadiene was prepared as described in Example IIA. A solution of 80 parts of this adduct in 640 parts of carbon tetrachloride was prepared. Chlorine gas (139 parts) was bubbled into the solution during a 4 hour period while the solution was iradiated with a mercury arc lamp (Westinghouse H5KA). Thereafter the solvent was removed and 122.8 parts of white solid was obtained. This was recrystallized from hexane. The recrystallized product melted at 185.5° to 191.5°. Nuclear magnetic resonance and elemental analysis of the product confirmed the compound as 1,2,3,4,6,6,7,7,10,10-Decachloro-1,4,4a,5,6,7,8,8a-octahydro-1,4:5,8-dimethanonaphthalene.

EXAMPLE IV

Preparation of a Bromo-Chloro-Derivative of the Mono-Adduct of Norbornene and Hexachlorocyclopentadiene A solution of 72.3 parts of bromine and 29 parts of chlorine in 160 parts of carbon tetrachloride was added slowly over about 3.75 hours to a solution of 100.5 parts of 1,2,3,4,10,10-hexachloro-1,4,4a,5,6,7,7,8a-octahydro-1,4:5,8-dimethanonaphthalene dissolved in 640 parts of carbon tetrachloride while the latter solution was irradiated with a 200 watt incandescent lamp. After completion of the addition of the solution the reaction mixture was irradiated for aout two additional hours and then permitted to stand without irradiation for about 16 hours. The solvent was stripped from the reaction mixture to yield 151.5 parts of light yellow oil which was determined by elemental analysis to be a mixture of bromochlorinated derivatives of the norbornene-hexachlorocyclopentadiene adduct having an average formula $C_{12}H_{7.5}Br_{1.5}Cl_7$.

EXAMPLE V

Preparation of 1,2,3,4,6,6,7,7,10,10-Decachloro-1,4,4a,a-Octahydro-1,4:5,8-Dimethanonaphthalene An adduct of hexachlorocyclopentadiene and norbornadiene was prepared as in Example IA. A solution of 78 parts of the adduct in 640 parts of carbon tetrachloride was prepared. The solution was irradiated with a 200 watt mercury arc lamp while 139 parts of chlorine was bubbled in over a 4-hour period. The reaction temperature was maintained at 50° C. The reaction mixture was stirred for an additional hour. Thereafter, the solvent was removed by distillation at reduced pressure to yield 118.8 parts of a white solid. The solid was recrystallized twice from hexane. The recrystallized product melted at 191° to 193° C. Nuclear magnetic resonance analysis confirmed the compound as 1,2,3,4,6,6,7,7,10,10-decachloro-1,4,4a,5,6,7,8,8a-octahydro-1,4:5,8-dimethanonaphthalene.

EXAMPLE VI

A molding composition was prepared by mixing 80 parts of polyethylene terphthalate, 15 parts of the product of Example IB, and 5 parts of antimony oxide. The composition as tested using a modified ASTM-D-635-72 procedure, and found to be self-extinguishing within 3 seconds with a one second afterglow.

EXAMPLE VII

The following materials were compounded on a two-roll mill at 50° to 70° to produce a rubber with good compatability:
- 50 parts of SBR (Ameripol 1500), a styrene-butadiene rubber;
- A mixture of 20 parts of carbon black and 5 parts of Mobisol oil;
- A mixture of 1 part stearic acid, 1.5 parts zinc oxide and 7.5 parts antimony oxide;
- 15 parts of the product of Example IB;
- A mixture of 1 part sulfur and 0.6 parts curing agent (Santocure);

The rubber was molded at 280° F into ⅛ inch bars which when tested according to the modified ASTM-D-635-72 procedure were self-extinguishing within 10 seconds. The composition exhibited an oxygen index of 26.5.

EXAMPLE VIII

A mixture of 50 parts of a commercial epoxy resin (Ciba Aroldite 6010. Batch No. 3649), 15 parts of antimony oxide, and 30 parts of the product of Example IB, above was ground to a paste. To this paste, a mixture composed of 50 parts of the same epoxy resin and 12 parts of diethylene triamine was added and the resultant mixture was cured. The cured epoxy resin composition was self-extinguishing within one second and had 4 seconds afterglow (by the modified ASTM-D635-72 procedure). The resin composition has an Oxygen Index (ASTM-D2863-70) of 33.5 and a VE-O rating according to the Underwriters Laboratories Test Method 94.

EXAMPLE IX

Twenty parts of a 3:1 mixture of the product of Example IB above, and antimony oxide was mixed with 80 parts of polystyrene Lustrex HF77). When tested, using the modified ASTM-D-635-72 procedure, the composition was self-extinguishing within 3 seconds with a 1 second afterglow. The composition exhibited an oxygen index of 23.7 (ASTM-D2863-70) and a VE-II rating according to the Underwriters Laboratories Test Method 94.

EXAMPLE X

A mixture of 69.5 parts of polypropylene (Avisun 1014), 20 parts of the product of Example IB, 10 parts of antimony oxide, 1 part of zinc stearate and 0.5 parts of a modified dibutyltin maleate stabilizer (Thermolite 24) was hot milled until homogeneous, sheeted and ground in a Wiley Mill. The ground blend was injection molded at 400° Fahrenheit, using a one ounce plunger type injection molder to produce bar boldings of the dimensions 5 × ½ × ⅛ inches. The composition was tested (ASTM-D635-72) and found to be self-extinguishing within 11 seconds with 10 seconds afterflow and exhibited an oxygen index of 25.

EXAMPLE XI

The product of Example IB was found to exhibit substantially improved thermal stability when tested in comparison with other fire retarding additives in thermoplastic compositions at molding temperatures.

Compositions of 83 parts of high impact polystyrene (Styron 492) 14.17 parts of fire retardant and 2.83 parts of antimony oxide were milled on a two-roll Farrel mill, ground and dried in an air circulating oven at 80° C for 2 hours and then molded at various temperatures in an Arburg Allrounder 200S injection molder.

Initially a 430° F melt temperature was selected and maintained while 5–10 sample specimens were injection molded. Subsequently, the melt temperatures were increased at 20°–25° F increments, allowing 10–15 minutes for the melt to each equilibrium temperatures. Temperatures were taken with a needlepoint pyrometer. At each of the temperatures, several specimens were taken and compared to previous specimens for discoloration, streaking and other signs of degradation.

In this manner the product of Example IB was compared for thermal stability with Dechlorane 602 additive, a commercially available fire retarding additive for styrenes. It was determined that the product of Example IB was thermally stable up to 525° Fahrenheit in the above composition while the Dechlorane 602 additive containing composition showed degradation at 490°–495° Fahrenheit.

EXAMPLE XII

A molded mixture of 83 parts of high impact polystyrene (Styron 492) 14.17 parts of the product of Example IIB, and 2.83 parts of antimony oxide was prepared and tested. The composition was found to be self-extinguishing when tested according to the procedure of ASTM-D-635-72. The mixture had an oxygen index of 23 (ASTM-D2863-70) and was VE-I (according to test UL-94).

EXAMPLE XIII

A molded mixture prepared from 85.0 parts of polystyrene (Lustrex HF 77) 11.25 parts of the product of Example IIB and 3.75 parts of antimony oxide, was found to be self-extinguishing when tested according to the procedure of ASTM-D-635-72. The composition exhibited an oxygen index of 23 (ASTM-D2863-70) and was VE-II (according to UL-94 test).

EXAMPLE XIV

A molded mixture prepared from 60 parts of polypropylene 27 parts of the product of Example IIB and 13 parts of antimony oxide was found to be self-extinguishing when tested according to the procedure of ASTM-D-635-72. The composition exhibited an oxygen index of 23 (ASTM-D2863-70) and was VE-II (according to UL-94 test).

EXAMPLE XV

A molding composition was prepared from 69.5 parts of polyethylene (DYNH-1), 20 parts of the product of Example IB, and 10 parts of antimony oxide. When tested according to a modified ASTM-D-635-72, the composition was self-extinguishing within 8 seconds with a 6 second afterglow. The composition has an Oxygen Index of 26.5.

EXAMPLE XVI

A molding composition was prepared from 80 parts of high impact polystyrene (Dylene-957), 15 parts of the product of Example III and 5 parts of antimony oxide. When tested according to a modified ASTM-D-635-72, the composition was self-extinguishing within 17 seconds with a 13 second afterglow. The composition had an Oxygen Index of 24.0.

EXAMPLE XVII

A molding composition was prepared from 69.5 parts of a copolymer of propylene and ethylene (Profax-7823) and 30 parts of a previously prepared mixture of 20 parts of the product of Example IB and 10 parts of antimony oxide. The composition was found to be self-extinguishing when tested according to a modified ASTM-D-635-72 test method.

EXAMPLE XVIII

The product of Example IB was tested for five retardance in comparison with Dechlorane 604 additive, a commercially available fire retardant additive, in compositions of high impact polystyrene. Molding compositions were prepared from 78 parts of high impact polystyrene (Styron 492) and 22 parts of a previously prepared mixture of 14.66 parts of the fire retardant additive and 7.33 parts of antimony oxide. The compositions were tested in accordance with the Underwriters Laboratory Test Method 94. The composition containing the product of Example IB was rated VE-O and was found superior to the composition containing the Dechlorane 604 additive.

EXAMPLE XIX

A molding composition was prepared from 73 parts of high impact polystyrene (Dylene-957) and 27 parts of the product of Example IB. The molding composition was found to be self-extinguishing within 11 seconds with no afterglow when tested according to a modified ASTM-D-635-72 test method and had an Oxygen Index of 28 (ASTM-2863-70).

EXAMPLE XX

A molding composition was prepared from 80 parts of high impact polystyrene (Dylene-957), 5 parts of antimony oxide and 15 parts of the product of Example IV. The molding composition was found to be self-extinguishing within 2 seconds with an afterglow of 11 seconds when tested according to a modified ASTM-D-635-72 test procedure and had an Oxygen Index of 26 (ASTM-2863-70).

30 seconds of which 20 seconds was injection time. A ram pressure of about 8,120 p.s.i. was used.

The molded samples were compared in appearance and tested for Oxygen Index by the testing produce of ASTM D-2863-70, for flame out, afterglow and drip by ASTM D-635-74, for Izod Impact Strength by ASTM D-256-73, tensile strength and elongation by ASTM D638-72, flexural strength and modulus by ASTM D-790-71, heat deflection temperature by ASTM D-648-72, and Rockwell hardness by ASTM D-785-65. The Shore hardness was measured with a Shore hardness tester. The results of these tests are compared in Table 1 below.

TABLE 1

| Components (Percentages): | | | |
| --- | --- | --- | --- |
| High Impact Polystyrene | 85 | 85 | 100 |
| Example IB Product | 0 | 11.25 | 0 |
| Citex BC-26 | 11.25 | 0 | 0 |
| $Sb_2O_3$ | 3.75 | 3.75 | 0 |
| Appearance of Molded Samples | Very Dark Grey | White | White |
| Fire Retardant Properties: | | | |
| Oxygen Index (Percent) | 25.2 | 25.3 | 18.5 |
| Flame out (seconds) | 15.3 | 7.0 | — |
| Afterglow (seconds) | 9.8 | 17.3 | — |
| Drip | yes* | No | — |
| Mechanical Properties: | | | |
| Tensile Strength at Yield (psi) | 4480 | 4190 | 4380 |
| Tensile Strength at Break (psi) | 4090 | 3430 | 4260 |
| Elongation at Yield (Percent) | 2.82 | 2.09 | 3.22 |
| Elongation at Break (Percent) | 5.33 | 13.3 | 36.0 |
| Notched Izod Impact Strength (ft.lb/in.) | 1.17 | 1.32 | 1.77 |
| Flexural Strength (psi) | 8690 | 7680 | 8620 |
| Flexural Modulus (psi × $10^5$) | 3.55 | 3.36 | 3.33 |
| Heat Deflection Temperature 66 psi | 82° | 81° | 90° |
| Heat Deflection Temperature 264 psi | 71° | 71° | 76° |
| Rockwell Hardness (L Scale) | 62 | 56 | 56 |
| Shore Hardness (D Scale) | 83 | 78 | 77 |

*Of three equivalent samples tested one dripped.

EXAMPLE XXI

In order to compare the properties of high impact polystyrene containing a fire retardant additive of the invention with a known fire retardant additive, 5,6-dibromo-1,10,11,12,13,13-hexachlortricyclo[8,2,1,0$^{2,9}$]-tridec-11-ene (Citex BC 26 manufactured by Cities Service Company), a control sample of high impact polystyrene (Styron 492 manufactured by Dow Chemical Co.) and sample mixtures containing 11.25% of each fire retardant additive together with 85% of the high impact polystyrene and 3.75% antimony trioxide were prepared by banding the polymer on a two roll Farrel mill at 300° F. for five minutes during which period the antimony oxide and organic fire retardants were mixed with the polymer. The mixtures were then sheeted and rebanded six times to achieve homogeneous compositions, the total milling time being about 10 minutes. The milled product sheets were scored, granulated and dried at 80°. From about 300 g. of each milled sample about 100 g. was reserved for testing in a Brabender Plasticorder Melt Rheometer as described below and the remaining 200 g. of each sample was injected molded into bars in a Newbury (Eldorado model) plunger type injection molder fitted with a one-inch diameter cylinder having a nominal capacity of one ounce. The mold was of multicavity type but only one ⅛ inch × ½ inch × 5 inch cavity thereof was employed. The molding temperature was 425° C, the overall cycle time was about From comparison of the molded samples it is apparent that the sample containing the fire retardant of Example IB of the invention is substantially stable on exposure to elevated molding temperature whereas the sample containing the prior art organic fire retardant was unstable as indicated by its very dark grey coloration.

Comparison of the fire retardant data of Table 1 indicates that the Example IB product is a better fire retardant agent for high impact polystyrene than Citex BC-26.

Comparison of the mechanical property data of Table 1 indicates that the Example IB product - containing polymer has a greater Izod impact strength and percent elongation at break compared to the polymer containing Citex BC-26 as flame retardant additive.

About a 50 g. sample of each milled polymer mixture containing fire retardant additive was charged to a C. W. Brabender Plasticorder Melt Rheometer equipped with roller type rotors operating at a 60 r.p.m. speed, and a 60 ml. capacity bowl maintained at 425° F. The torque (the decrease in torque with time being a measure of the instability of the molten mixture) was determined after 5, 15 and 30 minutes. Also at the same intervals the testing was interrupted to withdraw a small sample (less than about one gram) of the molten polymer which was pressed into a disk with tablet pliers, and allowed to cool to ambient temperature with the color of the cooled tablet being noted. The results of these tablets are presented in Table 2 below.

TABLE 2

| Organic Fire Retardant Additive: | Color of Cooled polymer Sample Withdrawn After: | | | Brabender Torque (m.-g.) | | | Total Decrease |
|---|---|---|---|---|---|---|---|
| | 5 min. | 15 min. | 30 min. | 5 min. | 15 min. | 30 min. | |
| Example IB Product | White | White | Slightly Off-White | 385 | 330 | 307 | 78 (about 20%) |
| Citex BC-26 | Off-White | Greyish Tan | Dark Greyish-Tan | 418 | 363 | 320 | 98 (about 23%) |

The more rapid discoloration and greater percent decrease in torque of the sample containing the prior art organic fire retardant additive indicate the greater stability of the composition of the invention at elevated temperature.

EXAMPLE XXII

The testing procedures described in Example XXI above were repeated substantially as described employing polystyrene (Lustrex HF-77-2020 manufactured by Monsanto Co.) instead of high impact polystyrene as the substrate polymer. The results of these tests are presented in Tables 3 and 4 below.

Comparison of the Brabender Test results of Table 4 indicate the substantially poorer stability of the polystyrene sample containing Citex BC-26 as compared to the polystyrene sample containing the Example IB product as indicated by the more rapid discoloration of the former composition at elevated temperature. This distinction is also indicated by comparison of the appearance of the molded samples as described in Table 3 wherein the molded polystyrene sample containing the prior art organic fire retardant additive is more severely discolored than the molded sample of the polystyrene composition of the invention.

TABLE 3

| Components (Percentages): | | | |
|---|---|---|---|
| Polystyrene | 85 | 85 | 100 |
| Example IB Product | 0 | 11.25 | 0 |
| Citex BC-26 | 11.25 | 0 | 0 |
| $Sb_2O_3$ | 3.75 | 3.75 | 0 |
| Appearance of Molded Samples: | streaked brown and grey | grey-streaked | colorless |
| Fire Retardant Properties: | | | |
| Oxygen Index (Percent) | 25.6 | 22.8 | 18.5 |
| Flame out (seconds) | 2.0 | 8.9 | 0 |
| Afterflow (seconds) | 0 | 0 | — |
| Drip | yes | yes* | — |
| Mechanical Properties | | | |
| Tensile Strength at yield (psi) | — | — | — |
| Tensile Strength at Break (psi) | 4560 | 5060 | 6680 |
| Elongation at Yield (Percent) | — | — | — |
| Elongation at Break (Percent) | 1.90 | 1.96 | 2.97 |
| Notched Izod Impact Strength (ft.-lb./in.) | 0.24 | 0.23 | 0.32 |
| Flexural Strength (psi) | 10,440 | 13,050 | 15,040 |
| Flexural Modulus (psi × $10^5$) | 4.97 | 4.97 | 5.07 |
| Heat Deflection Temperature, 66 psi | 82° | 81° | 88° |
| Heat Deflection Temperature, 264 psi | 72° | 73° | 77° |
| Rockwell hardness (L Scale) | 90 | 90 | 91 |
| Shore Hardness (D Scale) | 83 | 80 | 88 |

*Of three equivalent samples tested, only two dripped; of the other composition tested, all three equivalent samples dripped.

TABLE 4

| Organic Fire Retardant Additive: | Color of Cooled Polymer Sample Withdrawn After | | | Brabender Equilibrium Torque (m.-g.) | | | Total Decrease |
|---|---|---|---|---|---|---|---|
| | 5 min. | 15 min. | 30 min. | 5 min. | 15 min. | 30 min. | |
| Example IB Product | White | White | Slightly Off-White | 358 | 220 | 120 | 238 (about 66%) |
| Citex BC-26 | White | Light Greyish Tan | Greyish Tan | 333 | 203 | 110 | 223 (about 67%) |

The fire retardant data of Table 3 shows the organic fire retardant additive of the prior art to be an inferior five retardant for polystyrene compared to the additive of the invention in that greater dripping during sample combustion occurs with the prior art additive.

Comparison of the mechanical property data of Table 3 indicates that the Example IB product-containing sample is superior to the Citex BC-26-containing sample in flexural strength and tensile strength at break.

EXAMPLE XXIII

The testing procedures described in Example XXI were repeated substantially as described employing polypropylene (Exxon polypropylene, Grade CD-100) in place of high impact polystyrene as the polymer substrate with the percentage proportions of polymer, organic fire retardant additive and antimony oxide being, respectively, 70%, 22.5% and 7.5%. The results of these tests are presented in Tables 5 and 6 below.

TABLE 5

| Components (Percentages): | | | |
|---|---|---|---|
| Polypropylene | 70 | 70 | 100 |
| Example IB Product | 0 | 22.5 | 0 |
| Citex BC-26 | 22.5 | 0 | 0 |
| $Sb_2O_3$ | 7.5 | 7.5 | 0 |

TABLE 5-continued

| Appearance of Molded Samples: | Opaque, Grey, Interior of sample contains voids | Opaque, White Interior of sample free of voids | Translucent, Grey Interior of sample free of voids |
|---|---|---|---|
| Fire Retardant Properties: | | | |
| Oxygen Index (Percent) | 25.2 | 25.9 | 18.3 |
| Flame out (seconds) | 21.9 | 1.3 | — |
| Afterflow (seconds) | 22.1 | 0 | — |
| Drip | yes | yes | — |
| Mechanical Properties | | | |
| Tensile Strength at field (psi) | 4050 | 3990 | 5410 |
| Tensile Strength at Break (asi) | 3860 | no break* | 2110 |
| Elongation at Yield (percent) | 0.74 | 1.75 | 11.7 |
| Elongation at Break (percent) | 0.94 | no break* | 48.7 |
| Notched Izod Impact Strength (ft.lb./in.) | 0.35 | 0.40 | 0.54 |
| Flexural Strength (psi) | 6980 | 5570 | 9350 |
| Flexural Modulus(psi × $10^5$) | 2.29 | 1.70 | 2.98 |
| Heat Deflection Temperature, 66 psi | 78° | 70° | 104° |
| Heat Deflection Temperature, 264 psi | 53° | 48° | 58° |
| Rockwell Hardness (L Scale) | 41 | 21 | 58 |
| Shore Hardness (D Scale) | 72 | 68 | 76 |

*The ductility of the sample is so great that the sample does not break at the normal machine settings used in the test.

TABLE 6

| Organic Fire Retardant Additive: | Color of Cooled Polymer Sample Withdrawn After: | | | Brabender Torque (m.-g.) | | | Total Decrease |
|---|---|---|---|---|---|---|---|
| | 5 min. | 15 min. | 30 min. | 5 min. | 15 min. | 30 min. | |
| Example IB Product | White | White | Slightly off-white | 467 | 335 | 115 | 352 (about 75%) |
| Citex BC-26 | White | Light Greyish Tan | Greyish | 465 | 250 | 70 | 395 (about 85%) |

As indicated by the comparison in appearance of the molded samples in Table 5, the molded polypropylene sample containing the prior art organic fire retardant additive is distinguished from the unmolded polypropylene composition of the invention in unsatisfactory molding characteristics as evidenced by the formation of voids in the body of the former molded sample, which voids are absent from the molded sample of the polypropylene composition of the invention. Moreover the molded composition containing the prior art fire retardant additive is discolored whereas the corresponding molded composition of the invention is not, which result indicates the enhanced heat stability of the composition of the invention.

While molded mixtures compared in Table 5 are about equivalent in Oxygen Index, the organic fire retardant agent of the invention is distinguished as a superior fire retardant agent from the prior art fire retardant since substitution of the present fire retardant for the prior art organic fire retardant diminishes the flameout time of the polypropylene about 16.8-fold and completely eliminates the problem of afterglow.

With respect to mechanical properties the polypropylene composition of the invention is distinguished from the corresponding polypropylene composition containing the prior art organic additive by an enhanced notched Izod Impact strength and an enhanced ductility so great that the tensile strength and elongation at break at the present composition cannot be measured in accord with the procedures of ASTM D-638-72 (in as much as the sample cannot be broken at the normal machine settings of the test). As shown in Table 6 the rapid discoloration of the prior art additive-containing sample as compared to the relative negligible discoloration of the corresponding sample of the composition of the invention at the elevated temperature employed in the Brabender testing procedure is also indicative of the stability of the present polypropylene composition compared to the relative instability of the corresponding polypropylene composition containing the prior art inorganic additive. The higher percentage decrease in torque in the case of the prior art additive-containing composition as compared to the substantially lower percentage decrease in torque for the polypropylene composition of the invention further substantiates the aforementioned stability distinction between the compared compositions.

Certain of the preferred compounds of the present invention are disclosed in detail in copending Application Ser. No. 447,806 filed March 4, 1974 and now abandoned, the disclosure of which is incorporated herein by reference.

It will be apparent to those skilled in the art that many variations and modifications of the invention as hereinabove set forth may be made without departing from the spirit and scope of the invention. The invention is not to be construed as limited only to the examples given.

We claim:

1. A fire retardant polymeric molding composition comprising a nitrogen-free polymer, selected from the group consisting of polymers of mono-α-olefins, polystyrene, and high impact polystyrene and an effective fire retardant amount of a compound of the formula

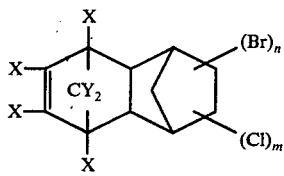

wherein X is a halogen selected from the group consisting of fluorine, chlorine and bromine, Y is independently selected from the group consisting of fluorine, chlorine, bromine, alkyl of 1 to 10 carbon atoms, alkyloxy wherein the alkyl group contains 1 to 10 carbon atoms, haloalkyl and haloalkyloxy wherein said alkyl groups contain from 1 to 10 carbon atoms and said halo is fluoro, chloro or bromo, $n$ has an average value from 0 to 6 and $m$ has an average value from 0 to 6 and the total of $n$ plus $m$ has an average value from 1 to 6.

2. The composition of claim 1 wherein the polymer is polypropylene.

3. The composition of claim 1 wherein the polymer is polystyrene.

4. The composition of claim 1 wherein the polymer is high impact polystyrene.

5. The composition of claim 1 wherein the polymer is polyethylene.

6. The composition of claim 1 wherein the polymer is a copolymer of ethylene and propylene.

7. The composition of claim 1 wherein $n$ has an average value of from 0 to about 2, $m$ has an average value of from 0 to about 4 and the total of $n$ plus $m$ is from about 1 to about 4.

8. The composition of claim 7 wherein X and Y are chlorine.

9. The composition of claim 8 wherein $n$ is about 2 and $m$ is 0.

10. The composition of claim 8 wherein $n$ has an average value of about 1.5 and $m$ has an average value of about 0.

11. The composition of claim 1 wherein the total of $n$ plus $m$ is from about 2 to 6, with the proviso that when the total of $n$ plus $m$ is about 2, $m$ is about 1 and $n$ is about 1.

12. The composition of claim 11 wherein $n$ has an average value of about 1.5 and $m$ has an average value of about 1.

13. The composition of claim 11 wherein $n$ is 0 and $m$ is about 4.

14. The composition of claim 1 wherein said compound is present in the amount of about 2 to about 50 percent by weight, based on the weight of the polymeric composition.

15. The composition of claim 1 wherein said compound is present in the amount of about 10 to about 35 percent by weight, based on the weight of the polymer composition.

16. The composition of claim 15 which includes about 1 to about 30 percent by weight of antimony oxide, based on the weight of the polymeric composition.

17. The composition of claim 8 wherein said compound is present in the amount of about 2 to about 50 percent by weight based on the polymeric composition.

18. The composition of claim 1 which includes about 1 to about 30 percent by weight of a metallic oxide compound, based on the weight of the polymeric composition, wherein the metal is selected from the group consisting of antimony, iron and zinc.

19. The composition of claim 18 which includes about 1 to about 30 percent by weight of antimony oxide, based on the weight of the polymeric composition.

20. The composition of claim 18 which includes about 1 to about 30 percent by weight of zinc oxide, based on the weight of the polymeric composition.

21. A fire retardant polymeric composition comprising between about 20 and 97 percent by weight of high impact polystyrene; about 2 to about 50 percent by weight of a compound of the formula

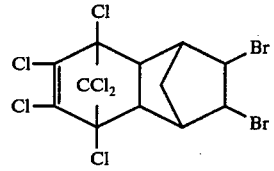

and about 1 to about 30 percent by weight of antimony oxide.

* * * * *